United States Patent
Makimoto

[15] 3,676,416
[45] July 11, 1972

[54] ISOPRENE POLYMERIZATION PROCESS AND CATALYST SYSTEM THEREFOR

[72] Inventor: Tsutomu Makimoto, Kurashiki, Japan
[73] Assignee: Kuraray Co., Ltd., Kurashiki, Japan
[22] Filed: Nov. 18, 1970
[21] Appl. No.: 90,799

Related U.S. Application Data

[63] Continuation-in-part of Ser. No. 70,504, Sept. 8, 1970, abandoned.

[30] Foreign Application Priority Data

Sept. 27, 1969 Japan..................................44/77269

[52] U.S. Cl..........................................260/94.3, 252/429 B
[51] Int. Cl.......................................C08d 1/14, C08d 3/10
[58] Field of Search..............................260/94.3; 252/429 B

[56] References Cited

UNITED STATES PATENTS

| | | | |
|---|---|---|---|
| 3,502,637 | 3/1970 | Marullo et al. | 260/94.3 |
| 3,523,114 | 8/1970 | Guppin | 260/94.3 |
| 3,580,899 | 5/1971 | Massoubre | 260/94.3 |

FOREIGN PATENTS OR APPLICATIONS 870,010  6/1971  Great Britain.......................260/94.3

Primary Examiner—Joseph L. Schafer
Assistant Examiner—Richard A. Gaither
Attorney—William Kaufman and Barry Kramer

[57] ABSTRACT

Polyisoprene exhibiting a high molecular weight, a high cis-1,4 content and containing essentially no gel is obtained by polymerizing isoprene in the presence of a catalyst system prepared from a trialkyl aluminum, a titanium tetrahalide and an aromatic polyether.

17 Claims, No Drawings

ISOPRENE POLYMERIZATION PROCESS AND CATALYST SYSTEM THEREFOR

This is a continuation-in-part of application Ser. No. 70,504 filed Sept. 8, 1970 now abandoned.

This invention relates to a process for the polymerization of isoprene. More particularly, this invention relates to a method of preparing high molecular weight, high cis-1,4-polyisoprene containing essentially no gel.

Cis-1,4-polyisoprene is known as a substitute for natural Hevea rubber. Various catalyst systems have heretofore been proposed for the production thereof. Generally, the catalysts which have heretofore been employed for the production of cis-1,4-polyisoprene are of the Ziegler-type and consist basically of a halide of a metal selected from Groups IV–VI of the Mendeleev Periodic Table and a trialkyl aluminum. In an alternative method, a metallic lithium-or organolithium-based catalyst system is employed.

It has been found, however, that when isoprene is polymerized to a high cis-1,4-polyisoprene employing a Ziegler-type catalyst, particularly a titanium tetrachloride-trialkyl aluminum catalyst system, under conditions producing a high molecular weight polyisoprene closely approaching the molecular weight of natural rubber, an increase in the gel content thereof is unavoidable and the resulting polymer usually contains a large amount of gel. As employed herein, the term "gel" is intended to encompass polymers which are insoluble in benzene. Generally, the gel consists of relatively hard gel which is referred to as "tight gel" and soft gel generally referred to as "loose gel". The presence of tight gel is considered to have a deteriorating effect on the properties of polyisoprene rubber.

On the other hand, in polymerizations employing a lithium-based catalyst, high molecular weight polyisoprene exhibiting less branches in its structure can be obtained, but the cis-1,4 content thereof is notably lower than that of either natural rubber or polyisoprene obtained through use of the Ziegler-type catalyst. Thus, the polyisoprene obtained through use of a lithium-type catalyst is generally not considered suitable as a substitute for natural Hevea rubber.

In view of the foregoing it would be highly desirable to provide a method for producing gel-free polyisoprene exhibiting a high molecular weight and high cis-1,4 content, which is comparable to natural rubber. Accordingly, it is an object of the present invention to provide a method whereby polyisoprene exhibiting a high molecular weight and high cis-1,4 content and containing essentially no gel can be obtained. Other objects will become apparent from the ensuing description of the present invention.

These as well as other objects are accomplished by the present invention which provides an isoprene polymerization process comprising polymerizing isoprene in an insert organic hydrocarbon in the presence of an effective amount of a catalyst system prepared from a trialkyl aluminum, a titanium tetrahalide and an aromatic polyether.

Methods of polymerizing isoprene using Ziegler-type catalyst systems to which ether is added have heretofore been proposed. It is further well known that the structure of the ether has significant influence on the properties of the polymer produced. None of these known methods, however, have enabled isoprene to be polymerized to an essentially gel-free polymer exhibiting a high molecular weight and high cis-1,4 content. For example, the addition of a lower aliphatic ether to a titanium tetrachloride-triisobutyl aluminum catalyst system results in a reduction in the cis-1,4 content of the polyisoprene obtained. In this instance, the cis-1,4 content varies with the specific lower aliphatic ether employed as follows: 30 percent cis-1,4 content obtained with dimethyl ether, 50 percent with methyl ethyl ether and 70 percent with diethyl ether. (W. Cooper et al., "The Polymerization of Conjugated Dienes", Progress In Polymer Science (Pergamon Press), Volume I, pages 125–126 (1967)). On the other hand, the addition of aromatic ethers substantially eliminates the formation of tight gel which is generally formed by the use of Ziegler-type catalysts thereby permitting polymerization to a high conversion without formation of tight gel resulting in the production of rubber of good quality (Japanese Patent Publication No. 8746/62; British Patent No. 870,010). Polymerization with a catalyst system employing aromatic ethers, however, is still accompanied by the formation of soft gel, i.e., even in this instance no polymer substantially free of gel can be obtained.

The addition of diisopropyl ether in the preparation of trans-1,4-polyisoprene employing a catalyst system comprising vanadium trichloride and trialkyl aluminum is known to provide an increase in the catalytic activity of the system (Japanese Patent Application No. 539/65). Another example in which an ether is added to a polymerization catalyst system is in the copolymerization of isoprene and styrene (Tsuruta et al., Chemistry of High Polymers, Japan, Vol. 26, page 311 (1969)). The addition of an ether in this case is directed to obtaining a reactivity ratio which is different from that ordinarily sought utilizing the fact that the characteristics of the copolymerization of isoprene and styrene are effected by the diffusion velocity of the monomers into the ether-containing system.

In view of the foregoing, it can be seen that the addition of aromatic polyethers in accordance with the present invention gives rise to a unique isoprene polymerization process. These unique effects obtainable through the addition of aromatic polyethers can be secured by reacting the aromatic polyether and a trialkyl aluminum prior to bringing the trialkyl aluminum into contact with a titanium tetrahalide, or by contacting a titanium tetrahalide with a trialkyl aluminum in the presence of an aromatic polyether. If desired, however, the aromatic polyether can be added to the mixture of a trialkyl aluminum and a titanium tetrahalide immediately after mixing the latter two components.

The aromatic polyether employed as a modifier for the catalyst system of the present invention is not limited in structure or the degree of polymerization thereof. Any type of aromatic polyether containing a repeating unit represented by the general formula

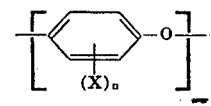

wherein X is an alkyl group containing from one to about four carbon atoms and $n$ is a number ranging from 0 to 4, can be employed. For example, high molecular weight poly-2,6-dialkyl-phenylene oxides having the repeating unit

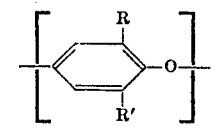

wherein R and R' are alkyl groups and having an intrinsic viscosity of at least about 0.3 in chloroform at 30° C. can be employed. The poly-2,6-dialkylphenylene oxides can be prepared from substituted phenols having the general formula

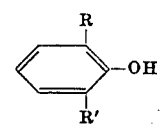

wherein R and R' are alkyl groups such as methyl, ethyl, isopropyl, tertiary butyl and the like, by the method of A.S. Hay et al (J. Polymer Sci., Vol. 58, page 581 (1962)).

Illustrative of the trialkyl aluminum compounds which can be emloyed in the present invention are trimethyl aluminum, triethyl aluminum, tripropyl aluminum, tri-normal-butyl aluminum, triisobutyl aluminum and the like.

Although any titanium tetrahalide can be employed in the present invention, titanium tetrachloride is most preferably employed.

Polyisoprene which is high in cis-1,4 content can be prepared employing a trialkyl aluminum and a titanium tetrahalide at a Ti:Al molar ratio ranging between about 1.0/0.8 and about 1.0/2.0. The amount of the aromatic polyether modifier to be used can range from about 0.8 to about 4.0 mole equivalent per mole of trialkyl aluminum, calculated as the amount of the repeating unit

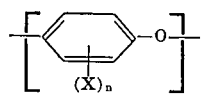

in the aromatic polyether. Preferably, the aromatic polyether is employed in an amount such that the molar ratio of the repeating unit in the aromatic polyether to be employed to trialkyl aluminum ranges from about 0.8:1 to about 4.0:1. The use of an aromatic polyether in an amount such that the molar ratio of the repeating unit in the aromatic polyether to trialkyl aluminum ranges from about 2.0:1 to about 4.0:1 does not generally show notable differences in the effects obtained even when the amount of the aromatic polyether actually employed varies within the said range. If, however, the amount of the aromatic polyether added exceeds a molar ratio of about 4.0:1, a retardation effect is observed.

The preparation of the catalyst and the polymerization reaction can be conducted in an inert atmosphere such as vacuum, nitrogen, argon or the like. The aromatic polyether and solvent are employed after thoroughly removing any water and oxygen (molecular oxygen) contained therein. The preparation of the catalyst is preferably conducted at a temperature below about 50° C., and temperatures of about room temperature or below are particularly preferred. The solvent employed can be any organic hydrocarbon which is not reactive with the components of the catalyst. For example, suitable solvents such as aliphatic saturated hydrocarbons having two to about 18 carbon atoms such as hexane, heptane and the like, aromatic hydrocarbons such as benzene, toluene and the like and alicyclic hydrocarbons such as cyclohexane, cycloheptane and the like, can be employed.

The polymerization of isoprene according to the present invention can be conducted in a diluent-solvent medium comprising an inert organic hydrocarbon at a temperature above the freezing point of said diluent-solvent, e.g., within the range of from about −50° C. to about +100° C. The reaction pressure is not considered critical and any suitable pressure such as atmospheric or elevated pressure can be employed. The weight ratio of isoprene monomer to diluent can be widely varied from about one-fiftieth to about one-half (of monomer/diluent). Illustrative of the inert organic hydrocarbons which can be employed as a diluent include, for example, aliphatic saturated hydrocarbons having from two to about 18 carbon atoms such as hexane, heptane and the like, aromatic hydrocarbons such as benzene, toluene and the like and alicyclic hydrocarbons such as cyclohexane, cycloheptane and the like. Among these diluents, particularly preferable diluents are those capable of dissolving the aromatic polyether, such as aromatic hydrocarbons or mixtures containing at least one aromatic hydrocarbon.

The amount of catalyst required for the polymerization of isoprene can vary over a wide range and will be determined to some extent by the purity of the isoprene monomer and the diluent employed. The proportion of the catalyst required will also be determined by the rate of polymerization and the molecular weight of the product which is desired. Usually, a catalytically effective amount of the catalyst which is sufficient for the polymerization of isoprene is an amount such that the titanium component contained in the catalyst is employed in an amount ranging from about 0.05 mole % based on the molar amount of isoprene up to about 5 mole % based on the amount of isoprene. Although the catalyst may generally be employed in an amount such that the amount of titanium component in the catalyst ranges from about 0.05 to 5 mole %, based on the isoprene monomer, an amount less than about 0.05 mole %, based on the isoprene monomer, of the titanium component and the corresponding quantities of aluminum and polyether components can also be employed when the purity of isoprene and diluent are sufficiently high.

The reaction products in the polymerization can be separated by conventional methods whereby polyisoprene rubber can be recovered. The polyisoprene obtained by the methods of the present invention exhibits a high cis-1,4 unit content (the cis-1,4 content generally being at least about 95% and usually about 96% or more) and high molecular weight, which are comparable to those of natural rubber, and it contains essentially no gel which is insoluble in benzene. Accordingly, the polyisoprene of the present invention exhibits low heat build-up as compared with other polyisoprenes produced by conventional methods. In addition, the polyisoprene produced by the present method is superior to conventional products in its dynamic properties, for example, flex crack-growth resistance, durability for repeated fatigue, abrasion resistance and the like.

The present invention will be further described by the following examples which are intended for illustrative purposes only. In the following examples, the yield of solid polymer is expressed in terms of the weight ratio of polymer obtained by solidifying with methanol to the weight of monomer charged. The viscosity is measured as that of a toluene solution at 30° C., and the gel content is measured by the weight ratio of insoluble substances in a 1% benzene solution of the total polymer obtained. All percentages and parts are by weight unless otherwise specified.

EXAMPLE 1

An ampoule having a 120 milliliter capacity was heated to 170° C. and then cooled in a stream of nitrogen. Into the ampoule were introduced 145 milligrams of poly-2,6-dimethylphenylene oxide (exhibiting an intrinsic viscosity of 0.57 in chloroform at 30° C.) obtained by the oxidative coupling polymerization of 2,6-dimethylphenol, dissolved in 80 milliliters of anhydrous benzene, to which 0.66 millimole of triethyl aluminum and 0.60 millimole of titanium tetrachloride were successively added in that order at room temperature to prepare the catalyst system of the present invention. The amount of the polyether employed in this example corresponds to 2.0 mole equivalents per mole triethyl aluminum, calculated as the amount of the repeating unit

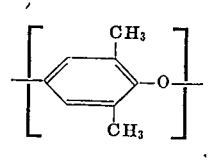

in the polyether. The molar ratio of

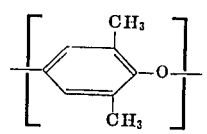

to triethyl aluminum is 2.0:1.

Into the ampoule containing the catalyst system of the present invention was introduced 20 milliliters of isoprene with a hypodermic syringe. The ampoule was sealed and shaken in a thermostat at 50° C. for 10 hours. The contents were then poured into 500 milliliters of methanol containing 1 percent antioxidant to precipitate the polymer formed. The precipitated rubbery polymer was recovered and dried at room temperature in a vacuum oven. The polymer yield was 81.5 percent. The resultant polymer was completely soluble in benzene at room temperature and no cross-linked polymers were detected. The intrinsic viscosity of the polymer was 5.1 dl/g in toluene solution at 30° C. By infrared absorption spectrum analysis, the microstructure of the polymer was found to consist of 97.1 percent of cis-1,4 units and 2.9 percent of 3,4-units. No trans-1,4 units nor 1,2-units were observed.

EXAMPLE 2

Employing the same procedure as in Example 1, 145 milligrams of poly-2,6-dimethylphenylene oxide was admixed with 0.66 millimole of triisobutyl aluminum, to which was added 0.60 millimole of titanium tetrachloride to prepare the catalyst system of the present invention. The amount of poly-2,6-dimethylphenylene oxide employed in this example corresponds to 2.0 mole equivalents per mole of triisobutyl aluminum, calculated as the amount of the repeating unit

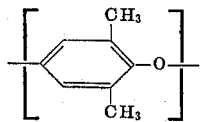

in the poly-2,6-dimethylphenylene oxide. Thus, the molar ratio of

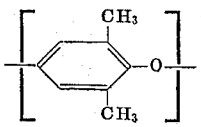

to triisobutyl aluminum was 2.0:1.

Employing the catalyst system so prepared, 20 milliliters of isoprene was polymerized in benzene at 50° C. for 6 hours whereby polyisoprene was obtained in a yield of 56.5 percent. The polymer was completely soluble in benzene at room temperature and contained no gel. Infrared analysis indicated the polymer to have a microstructure consisting of 97 percent of cis-1,4 units and 3 percent of 3,4-units. The intrinsic viscosity of the polymer was 4.12 dl/g.

A comparison between the results obtained in this example and those obtained under the same conditions employing a known Ziegler-type catalyst, i.e., triisobutyl aluminum-titanium tetrachloride (comparison 1) and a known ether modified Ziegler-type catalyst, i.e., triisobutyl aluminum-diphenyl ether-titanium tetrachloride, (comparison 2) are summarized in Table 1 below.

TABLE 1

| | Example 2 | Comparison 1 | Comparison 2 |
|---|---|---|---|
| Triisobutyl aluminum millimole | 0.66 | 0.66 | 0.66 |
| Titanium tetrachloride millimole | 0.60 | 0.60 | 0.60 |
| Ether (modifier) milligram (mg) | 145 | none | 110 |
| Solvent benzene milliliter (ml) | 80 | 80 | 80 |
| Isoprene milliliter (ml) | 20 | 20 | 20 |
| Polymer yield per cent (%) | 56.5 | 43.4 | 49.4 |
| Infrared Analysis (%) | | | |
| cis-1,4 | 97.0 | 96.6 | 96.3 |
| trans-1,4 | 0.0 | 0.0 | 0.0 |
| 1,2-structure | 0.0 | 0.0 | 0.0 |
| 3,4-structure | 3.0 | 3.4 | 3.7 |
| Intrinsic viscosity dl/g | 4.12 | 2.00 | 2.62 |
| Gel content per cent (%) | 0 | 29 | 15 |

EXAMPLE 3

Employing the identical procedure employed in Example 1, the catalyst was prepared from 105 milligrams of poly-2,6-dimethylphenylene oxide having a molecular weight of about 31,000, 0.44 millimole of triisobutyl aluminum and 0.40 millimole of titanium tetrachloride. The amount of poly-2,6-dimethylphenylene oxide in this instance corresponded to 1.2 mole equivalent per mole of triisobutyl aluminum, calculated as the amount of the repeating unit

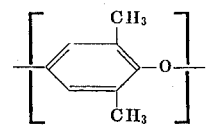

in the poly-2,6-dimethylphenylene oxide. The molar ratio of the repeating unit to triisobutyl aluminum was 1.2:1.

20 milliliters of isoprene monomer was polymerized at 50° C. for 10 hours employing the above-described catalyst system. A polyisoprene containing no gel was obtained in a yield of 47.5 percent exhibiting an intrinsic viscosity of 3.85 dl/g. The polymer had a cis-1,4 content of 96.9 percent and a 3,4 content of 3.1 percent.

For comparison the same mole equivalent of isotactic polypropylene oxide (51 milligrams of the isotactic polypropylene oxide) was substituted in lieu of the polyphenylene oxide. The isotactic polypropylene oxide exhibited an intrinsic viscosity of 3.69 in chloroform at 30° C. and was employed in the same manner as described hereinabove. Polyisoprene was obtained in a yield of 30 percent exhibiting a gel content of 19 percent. Accordingly, it is readily apparent that polypropylene oxide does not exhibit the unique effects exhibited by polyphenylene oxide in accordance with the present invention.

EXAMPLE 4

26 milligrams of poly-2,6-dimethylphenylene oxide was dissolved in 10 milliliters of benzene followed by mixing the resultant solution with 0.22 millimole of triisobutyl aluminum in 100 milliliters of hexane to which was added 0.20 millimole of titanium tetrachloride to prepare a catalyst system in accordance with the present invention. The amount of poly-2,6-dimethylphenylene oxide employed in this instance was 1.0 mole equivalent per mole of triisobutyl aluminum, calculated as the amount of the repeating unit in the poly-2,6-dimethylphenylene oxide. The molar ratio of the repeating unit to triisobutyl aluminum was 1:1.

Isoprene was polymerized using the above catalyst system at 50° C. for 10 hours following the same procedure described in Example 1. Polyisoprene was thus obtained in a yield of 81.5 percent and having a cis-1,4 content of 97.2 percent with no gel. The polyisoprene exhibited an intrinsic viscosity of 3.05 dl/g.

EXAMPLE 5

129 milligrams of poly-2,6-diethylphenylene oxide (which was synthesized in accordance with the aforementioned Hay's method and which exhibited an intrinsic viscosity of 0.45 in chloroform at 30° C.) and 0.72 millimole of triisobutyl aluminum were admixed in 100 milliliters of toluene to which was added 0.6 millimole of titanium tetrachloride to obtain a catalyst system in accordance with the present invention. The amount of poly-2,6-diethylphenylene oxide employed in this example corresponds to 1.2 mole equivalent per mole of triisobutyl aluminum, calculated as the amount of the repeating unit

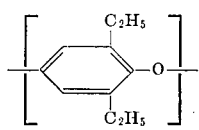

in the poly-2,6-diethylphenylene oxide. The molar ratio of the repeating unit to triisobutyl aluminum was 1.2:1.

20 milliliters of isoprene was polymerized employing the above-described catalyst system at 50° C. for 4 hours whereby polyisoprene was obtained in a yield of 22.2 percent. The polyisoprene was free of gel and exhibited an intrinsic viscosity of 4.8 dl/g and a cis-1,4 content of 96.5 percent.

EXAMPLE 6

Employing the same procedure as in Example 1, 98 milligrams of poly-2,6-dimethylphenylene oxide was admixed with 0.40 millimole of triisobutyl aluminum, to which was added 0.40 millimole of titanium tetrachloride to prepare the catalyst system of the present invention. The amount of poly-2,6-dimethylphenylene oxide in this instance corresponded to 2.0 mole equivalent per mole of triisobutyl aluminum, calculated as the amount of the repeating unit

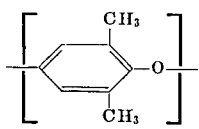

in the poly-2,6-dimethylphenylene oxide.

20 milliliters of isoprene monomer was polymerized at 50° C. for 6 hours employing the above-described catalyst system.

A polyisoprene containing no gel was obtained in a yield of 78.0 percent exhibiting an intrinsic viscosity of 3.43 dl/g. The polymer had a cis-1,4 content of 97.0 percent and a 3,4 content of 3.0 percent.

EXAMPLE 7

122 milligrams of poly-2,6-dimethylphenylene oxide and 0.40 millimole of triisobutyl aluminum were admixed in 100 milliliters of toluene to which was added 0.47 millimole of titanium tetrachloride to obtain a catalyst system in accordance with the present invention.

The amount of poly-2,6-dimethylphenylene oxide employed in this example corresponds to 2.5 mole equivalents per mole of triisobutyl aluminum, calculated as the amount of the repeating unit

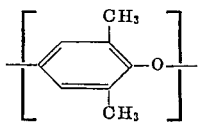

in the poly-2,6-dimethylphenylene oxide. The molar ratio of the repeating unit to triisobutyl aluminum was 2.5:1.

20 milliliters of isoprene was polymerized employing the above-described catalyst system at 50° C. for 4 hours whereby polyisoprene was obtained in a yield of 55.2 percent. The polyisoprene was essentially free of gel and exhibited an intrinsic viscosity of 3.12 dl/g and a cis-1,4 content of 96.3 percent.

For comparison the polymerization was carried out employing the same procedure and recipe as in the above instance except omitting the addition of poly-2,6-dimethylphenylene oxide. Polyisoprene was obtained in a yield of 85 percent exhibiting a gel content of 30 percent.

What is claimed is:

1. An isoprene polymerization process comprising polymerizing isoprene in the presence of an effective amount of a catalyst system prepared from a trialkyl aluminum, a titanium tetrahalide and an aromatic polyether wherein said polyether comprises the repeating unit represented by the general formula

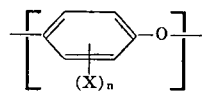

wherein X is an alkyl group having from one to four carbon atoms and N is a number ranging from 0 to about 4.

2. A method according to claim 1 wherein the aromatic polyether is a poly-2,6-dialkylphenylene oxide having an intrinsic viscosity of at least about 0.3 in chloroform at 30° C.

3. A method according to claim 2 wherein the poly-2,6-dialkylphenylene oxide is poly-2,6-dimethylphenylene oxide.

4. A method according to claim 2 wherein the poly-2,6-dialkylphenylene oxide is poly-2,6-diethylphenylene oxide.

5. A method according to claim 1 wherein the catalyst is prepared by reacting the aromatic polyether and a trialkyl aluminum prior to bringing the titanium tetrahalide and the trialkyl aluminum into contact.

6. A method according to claim 1 wherein the catalyst is prepared by contacting the titanium tetrahalide with the trialkyl aluminum in the presence of the aromatic polyether.

7. A method according to claim 1 wherein the titanium tetrahalide is titanium tetrachloride.

8. A method according to claim 1 wherein the trialkyl aluminum is a trialkyl aluminum in which the alkyl groups contain from 1 to about 4 carbon atoms in each alkyl group.

9. A method according to claim 8 wherein the trialkyl aluminum is triethyl aluminum.

10. A method according to claim 8 wherein the trialkyl aluminum is triisobutyl aluminum.

11. A method according to claim 1 wherein the molar ratio of the titanium tetrahalide to the trialkyl aluminum ranges from about 1.0:0.8 to about 1.0:2.0.

12. A method according to claim 1 wherein the aromatic polyether is employed in an amount such that the molar ratio of the repeating unit in the aromatic polyether to the trialkyl aluminum ranges from about 0.8:1 to about 4.0:1.

13. A method according to claim 1 wherein the catalyst is prepared at a temperature below about 50° C.

14. A method according to claim 1 wherein the polymerization reaction is conducted at a temperature ranging from about −50° C. to about +100° C.

15. A method according to claim 1 wherein the catalyst is employed in an amount such that the amount of titanium component in the catalyst ranges from about 0.05 to 5 mole %, based on the molar amount of isoprene monomer.

16. A method according to claim 1 wherein the polymerization is conducted in the presence of an inert organic hydrocarbon.

17. A method according to claim 16 wherein the weight ratio of isoprene monomer to the inert organic hydrocarbon is in the range of from about one-fiftieth to about one-half.

* * * * *